United States Patent [19]

Nagae et al.

[11] Patent Number: 5,618,592
[45] Date of Patent: Apr. 8, 1997

[54] LIQUID CRYSTAL DISPLAY DEVICE

[75] Inventors: Nobukazu Nagae, Tenri; Motohiro Yamahara, Osaka; Nobuaki Yamada, Higashiosaka, all of Japan

[73] Assignee: Sharp Kabushiki, Osaka, Japan

[21] Appl. No.: 459,723

[22] Filed: Jun. 2, 1995

[30] Foreign Application Priority Data

Jun. 9, 1994 [JP] Japan .................... 6-127618

[51] Int. Cl.$^6$ ................................ G02F 1/1337
[52] U.S. Cl. ................................ 428/1; 349/123
[58] Field of Search ................... 428/1; 359/75–79

[56] References Cited

U.S. PATENT DOCUMENTS 5,377,033  12/1994  Radcliffe .................... 359/75

FOREIGN PATENT DOCUMENTS

| 57-186735 | 11/1982 | Japan . |
| 3-14162 | 2/1991 | Japan . |
| 4-221935 | 8/1992 | Japan . |

Primary Examiner—Alexander Thomas
Attorney, Agent, or Firm—David G. Conlin; Brian L. Michaelis

[57] ABSTRACT

A liquid crystal display device according to the present invention comprises a pair of substrates opposing each other, a liquid crystal layer interposed between said substrates, and an alignment film formed on the liquid crystal layer side of at least one of said substrates, wherein said alignment films contain a crystalline branched polymer and have a spherulite structure.

6 Claims, 4 Drawing Sheets

FIG. 3 n = 3        n = 5        REPEATING UNIT n = 3 ~ 6

LIQUID CRYSTAL DISPLAY DEVICE

BACKGROUND OF THE INVENTION

1. Field of the Invention

The present invention relates to a liquid crystal display device, and in particular to a liquid crystal display device comprising a pair of substrates opposing each other, a liquid crystal layer interposed between the substrates, and an alignment film formed on the liquid crystal layer side of the substrates.

2. Description of the Related Art

Liquid crystal display devices comprising a pair of substrates opposing each other, and a liquid crystal layer of such as nematic liquid crystals interposed between the substrates have conventionally been widely used for numeral segment type display devices such as clocks, electronic calculators and the like. On the transparent substrate of the liquid crystal display device, an active element such as TFTs (Thin Film Transistors) is formed as a switching means for selectively driving the pixel electrodes which applies a driving voltage to the liquid crystal, and further color filter layers of red, green, and blue are placed as passive elements of a color display means. On the liquid crystal layer side of the color filter layers, an alignment film is formed so as to uniformly orient the liquid crystal.

Examples of such liquid crystal display devices, as categorized based on the twist angle of the liquid crystal, are: (a) an active type, twisted nematic (hereinafter referred to as "TN") liquid crystal display system in which nematic liquid crystal molecules are aligned so as to be twisted by 90°; and (b) a multiplex type, super twisted nematic (hereinafter referred to as "STN") liquid crystal display system in which nematic liquid crystal molecules having a twist angle of 90° or more are used so as to attain steep voltage-light transmittance characteristics, (the voltage being applied to the liquid crystal).

In the TN type liquid crystal display device, liquid crystal molecules, which originally have refractive index anisotropy, are aligned at a certain angle with respect to the pair of substrates, on whose surface electrodes are formed, so that the contrast of a displayed image depends on the viewing angle at which a viewer observes the liquid crystal display device. In other words, the TN type liquid crystal display device has a large viewing angle dependence. In particular, as the viewing angle becomes large with respect to a normal axis direction to the display, toward a direction where the display contrast improves (normally, the front side of the display), the black and white regions of the image suddenly reverse at a point when the viewing angle exceeds a certain value. This is well known as an "inversion phenomenon".

In order to improve such a phenomenon, a pixel dividing method (Japanese Laid-open Patent Publication No. 57-186735), a rubbing angle optimizing method (Japanese Laid-open Patent Publication No. 4-221935), a non-rubbing method (Japanese Patent Publication No. 3-14162), and the like have been proposed.

The pixel dividing method, for example, can eliminate the reverse phenomenon and viewing angle dependence along the vertical direction. However, this method has problems in that: the display contrast lowers; a black image appears grey when the viewing angle is tilted from the normal axis direction, i.e., a discoloration problem; and the liquid crystal display device has viewing angle dependence along a horizontal direction (i.e., from left to right) and/or a vertical direction (i.e., from top to bottom). The rubbing angle optimization method, although capable of improving the inversion phenomenon between white and black images, has problems in that a displayed image can appear properly in only a small range of viewing angles in a direction opposite to a direction along which an inversion phenomenon may occur, and that the display contrast when the liquid crystal display device is viewed at the normal axis direction decreases. The non-rubbing method has a problem in that disclination lines remain conspicuous.

The present inventors have examined the alignment films of a spherulite structure (i.e. crystalline structure in which the crystal is radially grown) containing a crystalline polymer for the purpose of accomplishing the wide viewing angle in all directions without performing the rubbing procedure.

The above-described alignment film of a spherulite structure has an important relationship between its spherulite diameter and its display characteristics. An alignment film having a smaller spherulite diameter provides better display characteristics such as contrast ratio, coarseness, etc., among those made from the same materials. Also, an alignment film having a rougher surface provides the smaller spherulite diameter, among those made from the same materials. However, the method which controls the spherulite diameter utilizing surface roughness is not suitable for a TFT substrate having a smooth surface. Thus, in the case where the alignment film is used in a device having TFT substrates, it is difficult to accomplish the formation of smaller spherulites in the alignment film, which causes some problems in the display characteristics such as contrast ratio, coarseness, etc.

SUMMARY OF THE INVENTION

The liquid crystal display device of this invention comprises a pair of substrates opposing each other, a liquid crystal layer interposed between said substrates, and an alignment film formed on the liquid crystal layer side of at least one of said substrates, wherein said alignment films contain a crystalline branched polymer and have a spherulite structure.

In one embodiment of the invention, the alignment films further contain a crystalline linear polymer.

In another embodiment of the invention, the alignment films contain a crystalline copolymer having repeating units of the crystalline branched polymer and repeating units of the crystalline linear polymer in its molecular chain.

In another embodiment of the invention, the crystalline linear polymer and the crystalline branched polymer contained in the alignment films have the same bond in the repeating units.

Alternatively, the liquid crystal display device of the present invention comprises a pair of substrates opposing each other, a liquid crystal layer interposed between said substrates, and an alignment film formed on the liquid crystal layer side of at least one of said substrates, wherein said alignment films comprise at least two layers of crystalline polymer films having a spherulite structure.

In one embodiment of the invention, the diameter of the spherulites, $d_1$ in the crystalline polymer film on the side closest to the substrate, and the diameter of the spherulites, $d_2$ in the crystalline polymer film on the side closest to the liquid crystal layer, have a relationship of $d_1 > d_2$.

Thus, the invention described herein makes possible the advantages of (1) providing a liquid crystal display device of high quality having an outstanding contrast ratio without any coarseness; (2) providing a liquid crystal display device of high quality by forming alignment films with a smaller diameter of spherulites capable of achieving a desired orientation state of liquid crystal molecules on substrates with a smooth surface such as TFT substrates; and (3) providing a liquid crystal display device having outstanding viewing angle dependence by forming alignment films with a flat spherulite structure of a two-dimensional growth.

These and other advantages of the present invention will become apparent to those skilled in the art upon reading and understanding the following detailed description with reference to the accompanying figures.

DESCRIPTION OF THE PREFERRED EMBODIMENTS

In the present specification, "same polymer" and "different polymer" are defined as follows. The polymers having the same bond which combines their repeating units, for example, —O— (an ether bond), —CONH— (an amide bond), —COO— (an ester bond), —NHCONH— (a urea bond), etc., are defined as the same polymer. Specifically, the polymers represented by formulae (I) and (II), and the polymers represented by formulae (III) and (IV) are respectively defined as the same polymers.

(I)

(II)            (III)

(IV)

Additionally, the polymers having the different bonds which combines their repeating units are defined as different polymers, even if the polymers have the same structure between the bonds in their repeating units (e.g., an aliphatic group, an aromatic group). Specifically, the polymers represented by formulae (V) and (VI) are defined as the different polymers.

Hereinafter, referring to FIGS. 1 to 3, a preferred embodiment of the present invention will be described.

Figure 1:
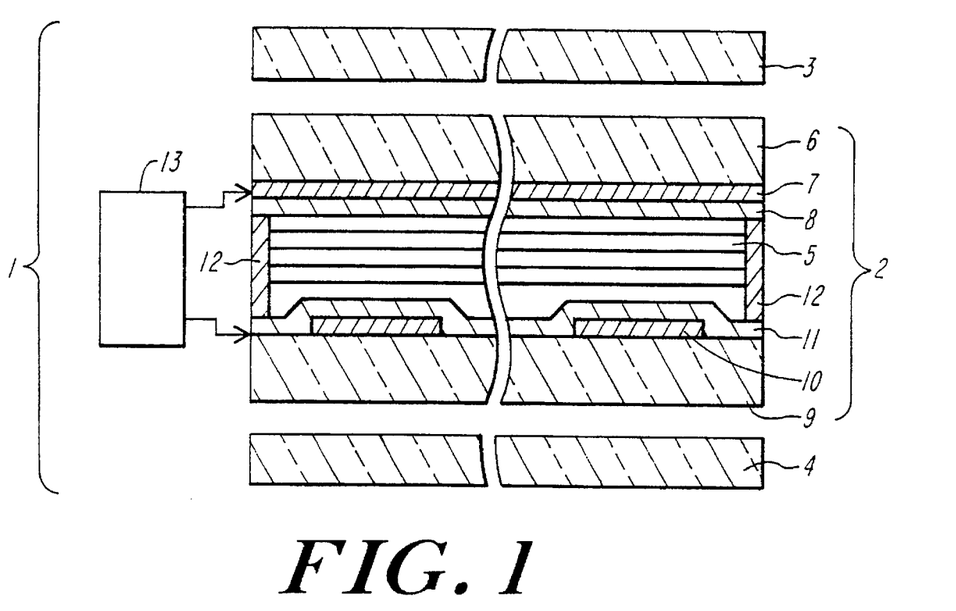
FIG. 1 is a cross-sectional view showing a liquid crystal display apparatus incorporating a liquid crystal display device according to an example of the present invention.

FIG. 1 is a cross-sectional view showing a liquid crystal display apparatus incorporating a liquid crystal display device according to the present embodiment. In FIG. 1, a liquid crystal display apparatus 1 has a liquid crystal display device 2 of the present embodiment, and a pair of polarizing plates 3 and 4 which are placed on both sides of the device 2. The liquid crystal display device 2 has substrate portions opposing each other, and a liquid crystal layer 5 interposed between the substrate portions. The upper substrate portion comprises a glass substrate 6 as a base substrate, a pixel electrode 7 which is a transparent electrode formed by sputtering ITO (indium tin oxide) on the surface of the liquid crystal layer side of the glass substrate 6, and an alignment film 8 formed on the pixel electrode 7. Also, the lower substrate portion comprises a glass substrate 9 as a base substrate, a pixel electrode 10 which is a transparent electrode formed by sputtering ITO on the surface of the liquid crystal layer side of the glass substrate 9, and an alignment film 11 formed on the pixel electrode 10. A peripheral portion of the pair of glass substrates 6 and 9 is sealed with a sealing resin 12. Both of the pixel electrodes 7 and 10 are connected to a driving circuit 13 from which a driving voltage is applied to both of the pixel electrodes 7 and 10 through TFTs (not shown) to display an image.

The pixel electrodes 7 and 10 are formed by keeping a prescribed spacing between those having a certain width. The pixel electrodes 7 and 10 are arranged at a right angle to each other from the normal direction of the glass substrates 6 and 9. The overlapped portions of both of the pixel electrodes 7 and 10 are pixels which contribute to the display. The pixels are arranged in the form of a matrix in the liquid crystal display apparatus 1. Moreover, the liquid crystal layer 5 is made from liquid crystal materials having a refractive index anisotropy Δn of 0.081 and 0.34% by weight of a chiral dopant added thereto. The thickness of the liquid crystal layer 5 is adjusted to about 5.5 μm.

These alignment films 8 and 11 have a spherulite structure. Moreover, these films contain crystalline branched polymer.

Figure 2:
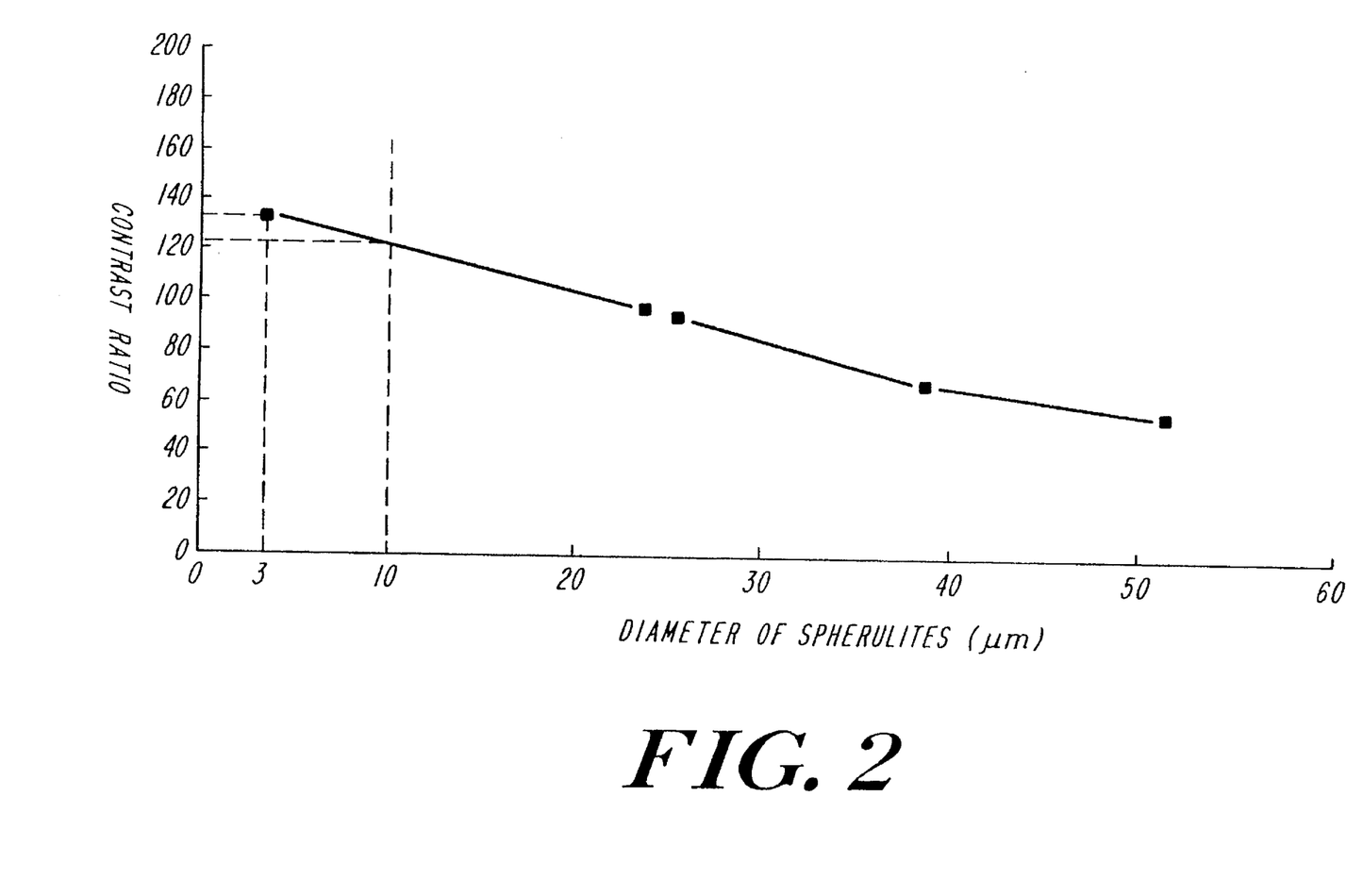
FIG. 2 is a graph showing the relationship between the contrast ratio of the liquid crystal display device and the spherulite diameter.

As shown in FIG. 2, the smaller spherulite diameter in an alignment film achieves the better contrast ratio. The spherulite diameter in an alignment film is preferably in the range of 0.1 to 10 μm, and more preferably in the range of 0.3 to 3 μm. When the diameter is less than 0.1 μm, spherulites are not formed in some cases. When the diameter exceeds 10 μm, many discrination lines occur among the liquid crystal domains at the time of applying a driving voltage, so it makes contrast low. As a result, display characteristics of the resultant liquid crystal display apparatus are insufficient. Specifically, the spherulites having too large diameters tend to vary greatly the contrast of the display image, because the orientation state of the liquid crystal molecules is varied macroscopically, owing to the large diameters of the spherulites. Furthermore, in the case where the diameters of the spherulites are large, the coarseness of the display image due to the nonuniformity of the spherulite size is often observed.

The preferred polymers that can be used for the alignment films 8 and 11 include crystalline branched polymers having a higher thermal resistance, chemical resistance and transparency. The examples of such polymers include polyamides and polyesters.

The number of the branches n in the molecules of a crystalline branched polymer, is preferably in the range 3 to 6, and more preferably in the range of 3 to 4. When the number of the branches n is less than 3, it is difficult to obtain spherulites with a small diameter while forming the alignment film described later. When the number of the branches n exceeds 6, the gelation of the solution for forming the alignment film is likely to occur while forming the alignment film, so that no solvent is applicable. As shown in FIG. 3, the number of the branches n is the number of the branches in the repeating units in the branched polymer.

Figure 3:
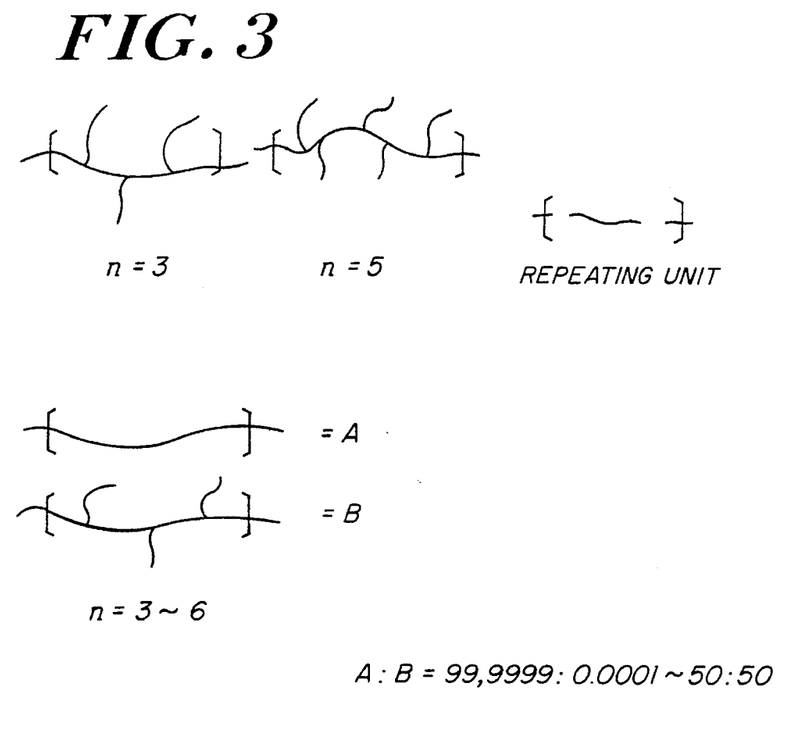
FIG. 3 is a schematic view of the branches of polymer chains.

Furthermore, as shown in FIG. 3, the repeating unit having branches is preferably in the range of 0.01 to 50%, and more preferably in the range of 0.5 to 20% in one molecule, based on the mole fraction of the repeating units. When one molecule has less than 0.01% of the repeating units having branches, the formation of smaller spherulites is difficult. When one molecule has more than 50% of the repeating units having branches, the gelation of the solution for forming the alignment film is likely to occur, so that no solvent is applicable.

Preferably, the alignment films 8 and 11 further contain a crystalline linear polymer. It is preferred that the crystalline linear polymer has a good compatibility with the above-mentioned crystalline branched polymer. Thus, typically, it is preferred that the crystalline linear polymer and the crystalline branched polymer are the same polymers. When they are different polymers, there is a possibility that phase separation may occur when they are blended.

The blend ratio between the crystalline linear polymer and the crystalline branched polymer varies depending upon the number of branches of the crystalline branched polymer and the presence ratio of the repeating units having branches. For example, in the case of a crystalline branched polymer having the number of branches n of 4 and 15% of repeating units with branches, the crystalline branched polymer is blended with the crystalline linear polymer preferably in an amount of about 3 to about 10 parts by weight based on 100 parts by weight of the crystalline linear polymer, and more preferably in the range of about 5 to about 7 parts by weight. When the blend ratio is less than 3 parts by weight, almost no effects on the control of the diameter of spherulites can be obtained while forming the alignment film described later. When the blend ratio exceeds 10 parts by weight, the gelation of the solution for forming the alignment film is likely to occur, so that no solvent is applicable.

In the case where the crystalline linear polymer and the crystalline branched polymer, which are the different polymer, are blended, the crystalline copolymer (e.g., AB type block copolymers) having repeating units of the crystalline branched polymer and repeating units of the crystalline linear polymer in its molecular chain is added. In order to enhance the compatibility, the crystalline copolymer is added to the blend of the branched polymer and the linear polymer preferably in an amount of about 3 to about 10 parts by weight, and more preferably in an amount of about 5 to about 7 parts by weight, based on 100 parts by weight of the blend.

The alignment films 8 and 11 are formed preferably by a solvent casting method, utilizing the crystalline branched polymer and, if required, the crystalline linear polymer and the crystalline copolymer. The method is as follows: (1) These polymers are dissolved in a solvent to prepare a solution; (2) The solution is coated onto the substrates; (3) Solvent is removed by heating; and (4) The alignment film is formed by cooling.

The examples of the solvent used for the solvent casting include phenols such as m-cresol, phenol, resorcinol; and calcium chloride saturated methanol.

Although the concentration of the solution varies depending on the characteristics of the above-mentioned polymers (e.g., molecular weight, the number of branches), the concentration is preferably in the range of 0.5 to 2 percent by weight, and more preferably in the range of about 0.9 to 1.5 percent by weight. When the concentration is less than 0.5 percent by weight, crystallization is not likely to occur and spherulites tend to become too large. When the concentration exceeds 2 percent by weight, the viscosity of the solution is high, so that the solution is difficult to spread when coated onto the substrate; thus, in some cases, the alignment film has a nonuniform thickness.

The heating temperature is preferably in the range of 120° to 160° C., and more preferably in the range of 130° to 150° C. The heating time is preferably in the range of 1 to 3 hours. The cooling rate is preferably in the range of 4° to 8° C./min., and more preferably in the range of 6° to 8° C./min.

The thickness of the alignment film thus obtained is preferably in the range of 0.1 to 1.5 ∞m, and more preferably in the range of 0.5 to 1.0 μm.

The following illustrate the mechanism controlling the spherulite structure (i.e. forming smaller spherulites) in an alignment film.

The spherulite is formed when the alignment film is formed. A crystalline nucleus is first generated and crystal grows around the core to form the spherulite. A portion of the crystalline polymer having less fluctuation, i.e., that having less mobility of the polymer molecules in a thick polymer solution becomes a crystalline nucleus in the generation stage of the crystalline nucleus. Thus the control of the mobility of the polymer molecules in the solution makes it easy to generate the nucleus. In the present example, by introducing a branched structure into polymer chains, that is, by using branched polymers for forming the alignment film, the mobility of the polymer molecules in the solution can be remarkably controlled. Because of this, more crystal nuclei are generated compared with the case of using only the linear polymer. As a result, the spherulites adjacent to each other are impinged on each other in the growth stage thereof to inhibit the growth of each other, and the size of the spherulites remains small.

The liquid crystal display device 2 comprising the alignment films 8 and 11 has outstanding display characteristics without viewing angle dependence, because the liquid crystal molecules of the liquid crystal layer 5 are radially oriented on the small spherulites formed on the alignment films.

Figure 4:
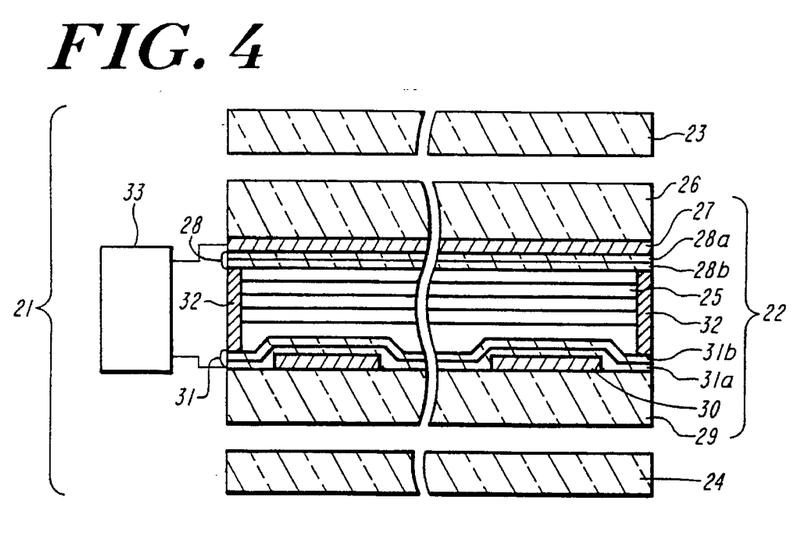
FIG. 4 is a cross-sectional view showing a liquid crystal display apparatus incorporating a liquid crystal display device according to an another example of the present invention.

Referring to FIG. 4, another preferred embodiment of the present invention will be described. In the present embodiment, the alignment films have at least two layers.

FIG. 4 is a cross-sectional view showing a liquid crystal display apparatus incorporating a liquid crystal display device according to the present embodiment. In FIG. 4, a liquid crystal display apparatus 21 has a liquid crystal display device 22 of the present embodiment, and a pair of polarizing plates 23 and 24 which are placed on both sides of the device 22. The liquid crystal display device 22 has substrate portions opposing each other, and a liquid crystal layer 25 interposed between the substrate portions. The upper substrate portion comprises a glass substrate 26 as a base substrate, a pixel electrode 27 which is a transparent electrode formed by sputtering ITO (indium tin oxide) on the surface of the liquid crystal layer side of the glass substrate 26, a first alignment film 28a formed on the pixel electrode 27, and a second alignment film 28b formed on the first alignment film 28a. Also, the lower substrate portion comprises a glass substrate 29 as a base substrate, a pixel electrode 30 which is a transparent electrode formed by sputtering ITO on the surface of the liquid crystal layer side of the glass substrate 29, a first alignment film 31a formed on the pixel electrode 30, and a second alignment film 31b formed on the first alignment film 31a. A peripheral portion of the pair of glass substrates 26 and 29 is sealed with a sealing resin 32. Both of the pixel electrodes 27 and 30 are connected to a driving circuit 33 from which a driving voltage is applied to both of the pixel electrodes 27 and 30 through TFTs (not shown) to display an image.

The pixel electrodes 27 and 30 are formed by keeping a prescribed spacing between those having a certain width. The pixel electrodes 27 and 30 are arranged at a right angle to each other from the normal direction of the glass substrates 26 and 29. The overlapped portions of both of the pixel electrodes 27 and 30 are pixels which contribute to the display. The pixels are arranged in the form of a matrix in the liquid crystal display apparatus 21. Moreover, the liquid crystal layer 25 is made from liquid crystal materials having a refractive index anisotropy Δn of 0.081 and 0.34% by weight of a chiral dopant added thereto. The thickness of the liquid crystal layer 25 is adjusted to about 5.5 μm.

Hereinafter, the case where the alignment films 28 and 31 have the first alignment films 28a and 31a and second alignment films 28b and 31b, respectively, will be described.

The above-mentioned crystalline polymer can be used for the first alignment films 28a and 31a. The crystalline linear polymer or crystalline branched polymer can be used as long as it does not prevent the alignment film from being formed.

As a polymer used for the second alignment films 28b and 31b, the same polymer as that used for the first alignment film or a different polymer having good wettability are preferred.

A method for forming the first alignment films 28a and 31a and the Second alignment films 28b and 31b and preferred forming conditions thereof are basically the same as described above. Only characteristic requirements in the present embodiment will be described below.

As a solvent used for forming the alignment films (i.e., used for a solvent casting method), solvents, in which a polymer used for the alignment films is not readily dissolved, are preferred. In particular, solvents, in which the polymer used for the first alignment films 28a and 31a is not readily dissolved, are preferred. In the case where a solvent allowing a polymer used for the first alignment films 28a and 31a to be readily dissolved therein is used, when a solution forming the second alignment films 28b and 31b is coated onto the surface of the first alignment films 28a and 31a, the first alignment films 28a and 31a will be dissolved. As a result, the first alignment films 28a and 31a do not function as a crystal nucleus for forming spherulites. For example, in the case of using polyamide for the first alignment films 28a and 31a, m-cresol is preferably used as a solvent.

Assuming that the cooling speed for forming the first alignment film and that for forming the second alignment film are respectively $S_1$ and $S_2$, $S_1 \leq S_2$ is preferred. In the case where a number of crystal nuclei are formed in the first alignment film, small spherulites may be formed in the second alignment film even under the condition of $S_1 > S_2$. Specifically, $S_1$ is preferably in the range of 2° to 8° C./min, more preferably in the range of 4° to 8° C./min, and $S_2$ is preferably in the range of 4° to 8° C./min, and more preferably in the range of 6° to 8° C./min.

Next, a method for controlling the spherulite structure (i.e., for forming smaller spherulites) in an alignment film including two or more layers will be described.

It is known that when a crystalline polymer solution is coated onto a film with a number of crystals formed therein, crystals grow around the crystal nuclei which has already been formed in the film. When spherulites are allowed to grow in such a film at an appropriate cooling speed nuclei to be newly formed during a cooling step and crystals which have already been present in the film function as cores. Because of this, more crystal nuclei can be generated, compared with the case of allowing spherulites to be formed in one layer. As a result, spherulites adjacent to each other are impinged by each other during the spherulite growth in the second layer and inhibit the growth of each other. This causes spherulites in the second layer to be smaller. Thus, the size $d_1$ of the spherulites in the first layer and the size $d_2$ of the spherulites in the second layer have the relationship: $d_1 > d_2$. In the present embodiment, a two-layered structure has been described. According to this method, when a multilayered structure is formed, the size of spherulites becomes smaller toward the uppermost layer.

The liquid crystal display device 22 comprising the alignment films 28b and 31b has outstanding display characteristics without viewing angle dependence, because the liquid crystal molecules of the liquid crystal layer 25 are radially oriented on the small spherulites formed on the alignment films.

Although chiral dopant is added to the liquid crystal layer 5 in each of the above-mentioned embodiments, the same results are obtained without using the chiral dopant. Moreover, in each of the above-mentioned embodiments, although the alignment films of the present invention are formed on both pixel electrodes, the alignment film of the present invention may be formed on only one of the electrodes. Especially, when the alignment film of the present invention is formed on a TFT substrate in which the pixel surface is smooth, it is possible to achieve smaller spherulites in an alignment film which had been difficult to be accomplished before.

It is noted that the above-mentioned embodiments may be combined. That is, the effect on the formation of smaller spherulites becomes more significant by using a crystalline branched polymer and by forming an alignment film having two or more layers.

According to the present invention, the mobility of the polymer molecules in the solution is significantly decreased by using a branched polymer for an alignment film. Because of this, more crystalline nuclei are generated by using a crystalline branched polymer for an alignment film, compared With the case of using only a crystalline linear polymer. As a result, spherulites adjacent to each other are impinged by each other during the growth of spherulites to inhibit the growth of each other, leading to the formation of smaller spherulites. Thus, even in the case where an alignment film is formed on a substrate with a smooth surface such as a TFT substrate, optimized small spherulites can be formed, resulting in a liquid crystal display device of high quality having a outstanding contrast ratio without coarseness. Furthermore, the alignment film thus obtained has a flat spherulite structure of a two-dimensional growth, so that liquid crystal molecules are radially aligned on each spherulite. As a result, viewing angle dependence of the liquid crystal display device can be improved.

Furthermore, by blending the crystalline branched polymer with the crystalline linear polymer, the solubility of a polymer in a solvent is improved during the formation of an alignment film. As a result, the moldability of the alignment film is enhanced and the size of spherulites becomes uniform, whereby coarseness can be further decreased. In this case, by blending the same polymers, there will be no possibility of phase separation. Furthermore, in the case where different polymers are blended, the compatibility therebetween can be enhanced by adding a crystalline copolymer having repeating units of the respective polymers to the blend.

Alternatively, by forming an alignment film having two or more layers, nuclei to be newly formed during the step of forming the second or subsequently layer in addition to the nuclei which have already been present in the first film function as cores. Because of this, more crystal nuclei can be generated, compared with the case of forming spherulites in one layer. During the growth of spherulites in the second or subsequently formed layer, spherulites adjacent to each other are impinged by each other to inhibit the growth of each other; therefore, spherulites in the second or subsequently formed layer become smaller. In this case, the size of spherulites becomes smaller toward the uppermost layer. Thus, even in the case where an alignment film is formed on a substrate with a smooth surface such as a TFT substrate, optimized small spherulites can be formed, resulting in a liquid crystal display device of high quality having a outstanding contrast ratio without coarseness. Furthermore, the alignment film thus obtained has a flat spherulite structure of a two-dimensional growth, so that liquid crystals are radially aligned in each spherulite and viewing angle dependence of the liquid crystal display device can be improved.

EXAMPLES

Hereinafter, the present invention will be described by way of illustrative examples.

Example 1

First, 1.16 g (0.0095 mole) of hexamethylenediamine, 0.119 g (0.0005 mole) of 2,4,5,6-tetraaminopyrimidine, 0.8 g (0.02 mole) of sodium hydroxide, and 0.3 g of sodium lauryl sulfate were dissolved in 30 ml of distilled water. The solution was mixed with 30 ml of a 0.01 mole methylethylketone solution of adipic acid chloride. The mixed solution was then stirred for 60 minutes at the temperature of 60° C. so that the solution was reacted. The reaction solution was allowed to precipitate in acetone to obtain a coarse polymer therefrom. The coarse polymer was washed with hot water and dried to obtain a powdery polymer. The polymer thus obtained was crystalline polyamide (nylon) having about 4% repeating units with branches in one molecule. The polymer was dissolved in m-cresol to prepare its 1 percent by weight solution.

Figure 5:
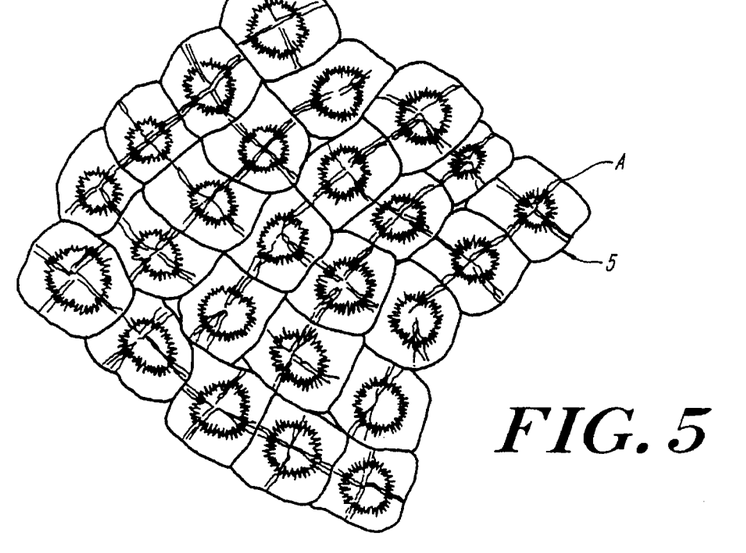
FIG. 5 is a diagram showing an orientation state of liquid crystal molecules in the alignment film of the liquid crystal display device of the present invention.

The 1 percent by weight solution was applied to substrates, maintained at 140° C. for 2 hours, and thereafter cooled at a cooling rate of 6° C./min. to room temperature to form alignment films 8 and 11, and a liquid crystal display device 2 was produced by combining a pair of the substrates on which the alignment films had been formed, and interposing a liquid crystal layer between the substrates. When the alignment film was observed with a polarization microscope, the alignment film has a flat spherulite structure of a two-dimentional growth. Furthermore, the diameter of the spherulites was 0.5 µm. In the liquid crystal display apparatus 1 using the liquid crystal display device 2 thus formed in this example, it was confirmed by a polarization microscope that the liquid crystal layer 5 which is in contact with the surface of the alignment films 8 and 11 was in such a state as shown in FIG. 5. The liquid crystal layer 5 is aligned on the spherulites in the alignment films, and A in FIG. 5 indicates its quenching portion.

The ratio of the frontal transmittance of the liquid crystal display apparatus at the time of applying a driving voltage (V=5V) and of not applying a driving voltage (V=0V) is defined as a contrast ratio which is evaluated and illustrated in Table 1. Furthermore, the coarseness was visually observed. The result is also shown in Table 1.

Figure 6:
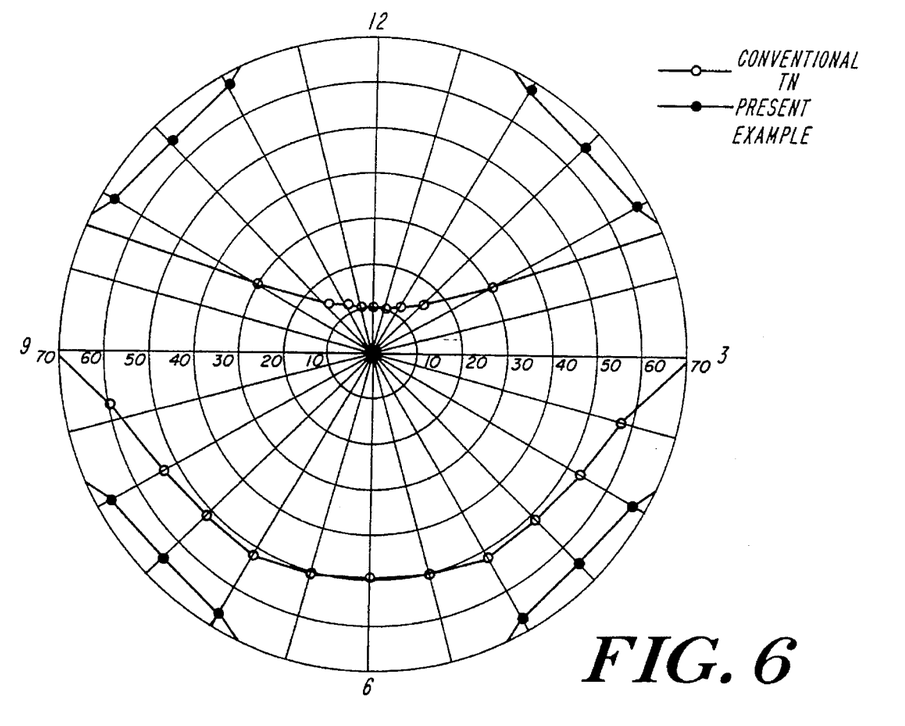
FIG. 6 is a radar chart showing the equicontrast curve of the liquid crystal display device of FIG. 1.

Also, an evaluation of the viewing angle characteristics of the apparatus of the present example indicated wide viewing angle characteristics, as shown in FIG. 6, such that a contrast value of 10 or more is obtained in a viewing angle of ±50° or more with respect to all viewing directions.

Comparative Example 1

Alignment films 8 and 11 were formed in the same way as in Example 1, except that nylon 6,6 which is a crystalline linear polymers was used. The diameter of the spherulites in the alignment films was 30 µm. A liquid crystal display apparatus 1 was produced and was evaluated for the contrast ratio and the coarseness in the same way as in Example 1. The results are shown in Table 1.

Example 2

First, 0.119 g (0.01 mole) of 2,4,6-triaminopyrimidine, 1.2 g (0.03 mole) of sodium hydroxide, and 0.3 g of lauryl sodium sulfate were dissolved in 30 ml of distilled water. The solution was mixed with 30 ml of a 0.015 mole acetophenone solution of isophthalic acid chloride. The mixed solution was then stirred for 60 minutes at the temperature of 50° C. so that the solution was reacted. The reaction solution was allowed to precipitate in 500 ml of acetone to obtain a coarse polymer therefrom. The coarse polymer was washed with hot water and dried to obtain a powdery polymer. The polymer thus obtained was crystalline branched polyamide. 5 parts by weight of the branched polymer and 95 parts by weight of nylon 6,6 (which is a crystalline linear polymer) were blended. The blend was dissolved in m-cresol to prepare its 1 percent by weight solution.

The 1 percent by weight solution was applied to substrates, maintained at 140° C. for 2 hours, and thereafter cooled at a cooling rate of 4° C./min. to room temperature to form alignment films 8 and 11, and a liquid crystal display device 2 was produced by combining a pair of substrates on which the alignment films had been formed, and interposing a liquid crystal layer between the substrates. When the alignment film was observed with a polarization microscope, the alignment film had a flat spherulite structure of a two-dimentional growth. Furthermore, the diameter of the spherulites was 1 μm. A liquid crystal display apparatus 1 was produced and was evaluated for the contrast ratio and the coarseness in the same way as in Example 1. The results are shown in Table 1.

Comparative Example 2

Alignment films 8 and 11 were formed in the same way as in Example 2, except that nylon 6,6 which is a crystalline linear polymer only was used. The largest diameter of the spherulites in the alignment films was 40 μm. A liquid crystal display apparatus 1 was produced and was evaluated for the contrast ratio and the coarseness in the same way as in Example 2. The results are shown in Table 1.

Example 3

Alignment films 8 and 11 were formed in the same way as in Example 2, except that 10 parts by weight of the crystalline branched polyamide obtained in Example 2 and 90 parts by weight of nylon 6,6 (which is a crystalline linear polymer) were used, and cooled at a cooling rate of 7° C./min.. The diameter of the spherulites in the alignment films was 1 μm. A liquid crystal display apparatus 1 was produced and was evaluated for the contrast ratio and the coarseness in the same way as in Example 1. The results are shown in Table 1.

Example 4

A 1% by weight m-cresol solution of nylon 6,6 which is a crystalline linear polymer was applied to substrates by the spin coating method, maintained at 140° C. for 2 hours, and thereafter cooled at a cooling rate of 8° C./min. to room temperature to form first alignment films 28a and 31a. When the spherulite structure was observed with the polarization microscope, the Schlieren texture formed by the orientation of the liquid crystal molecules was observed as shown in FIG. 5. The diameter of the spherulites in the first alignment films was approximately 6 μm. The second alignment films 28b and 31b were formed on the first alignment films 28a and 31a in the same manner as described above. The diameter of the spherulites in the second alignment films was approximately 0.5 μm. A liquid crystal display apparatus 1 was produced and was evaluated for the contrast ratio and the coarseness in the same way as in Example 1. The results are shown in Table 1.

Comparative Example 3

A liquid crystal display apparatus 1 was produced in the same way as in Example 4, except that only the first alignment films 28a and 31a were used. The apparatus was evaluated for the contrast ratio and the coarseness in the same way as in Example 4. The results are shown in Table 1.

TABLE 1

|  | Diameter of spherulites (μm) | Contrast ratio | Coarseness |
| --- | --- | --- | --- |
| Example 1 | 0.5 | 140 | ○ |
| Comparative Example 1 | 30 | 75 | × |
| Example 2 | 1 | 135 | ○ |

TABLE 1-continued

|  | Diameter of spherulites (μm) | Contrast ratio | Coarseness |
| --- | --- | --- | --- |
| Comparative Example 2 | 40 | 60 | × |
| Example 3 | 1 | 130 | ○ |
| Example 4 | 0.5 | 145 | ○ |
| Comparative Example 3 | 6 | 121 | × |

As is apparent from Table 1, the liquid crystal display apparatus using the liquid crystal display device according to the present invention exhibits excellent display characteristics having an outstanding contrast ratio without any coarseness. To the contrary, the apparatus of the comparative examples exhibits a low contrast ratio and the coarseness of the display image was observed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising a pair of substrates opposing each other, a liquid crystal layer interposed between said substrates, and an alignment film formed on the liquid crystal layer side of at least one of said substrates, wherein said alignment films contain a crystalline branched polymer and have a spherulite structure.

2. The liquid crystal display device of claim 1, wherein the alignment films further contain a crystalline linear polymer.

3. The liquid crystal display device of claim 2, wherein the alignment films contain a crystalline copolymer having repeating units of the crystalline branched polymer and repeating units of the crystalline linear polymer in its molecular chain.

4. The liquid crystal display device of claim 2, wherein the crystalline linear polymer and the crystalline branched polymer contained in the alignment films have the same bond in the repeating units.

5. A liquid crystal display device, comprising a pair of substrates opposing each other, a liquid crystal layer interposed between said substrates, and an alignment film formed on the liquid crystal layer side of at least one of said substrates, wherein said alignment films comprise at least two layers of crystalline polymer films having a spherulite structure.

6. The liquid crystal display device of claim 5, wherein the diameter of the spherulites, $d_1$ in the crystalline polymer film on the side closest to the substrate, and the diameter of the spherulites, $d_2$ in the crystalline polymer film on the side closest to the liquid crystal layer, have a relationship of $d_1 > d_2$.

* * * * *